United States Patent [19]

Driessen et al.

[11] Patent Number: 4,888,698

[45] Date of Patent: Dec. 19, 1989

[54] METHOD FOR STORING A PARCELWISE DIVIDED DIGITAL DATA BASE AS WELL AS OF ADDRESSING A DATA PARCEL IN A MASS MEMORY, AND APPARATUS FOR CARRYING OUT THE METHOD

[75] Inventors: Leonardus M. H. E. Driessen; Cornelis P. Janse; Paul D. M. E. Lahaije, all of Eindhoven, Netherlands

[73] Assignee: U.S. Philips Corporation, New York, N.Y.

[21] Appl. No.: 110,303

[22] Filed: Oct. 19, 1987

[30] Foreign Application Priority Data

Oct. 23, 1986 [NL] Netherlands .......................... 8602654

[51] Int. Cl.$^4$ ............................................. G06F 15/50
[52] U.S. Cl. ..................................... 364/443; 364/200; 364/300; 340/995; 365/238
[58] Field of Search ................ 364/443, 449, 200, 900, 364/518, 521; 340/995, 996; 73/178 R

[56] References Cited

U.S. PATENT DOCUMENTS

| | | | |
|---|---|---|---|
| 3,597,745 | 8/1971 | Lahrson et al. | 340/172.5 |
| 4,550,317 | 10/1985 | Moriyama et al. | 364/449 |
| 4,685,068 | 8/1987 | Greco, II et al. | 364/518 |
| 4,692,880 | 9/1987 | Merz et al. | 364/521 |
| 4,706,198 | 11/1987 | Thurman | 364/439 |
| 4,737,927 | 4/1988 | Hanabusa et al. | 364/443 |
| 4,773,026 | 9/1988 | Takahara et al. | 364/518 |

FOREIGN PATENT DOCUMENTS

86/02764  5/1986  PCT Int'l Appl. .

OTHER PUBLICATIONS

T. Matsuyama et al., "A File Organization for Geographic Information Systems Based on Spatial Proximity", Computer Vision, Graphics & Image Processing, 6/26/84, No. 3, pp. 303–318.

Lauzon et al., "Two-Dimensional Run-Encoding for Quad Tree", Computer Vision, Graphics, and Image Processing, vol. 30, No. 1, Apr. 1985, pp. 56–59.

Primary Examiner—Parshotam S. Lall
Assistant Examiner—V. N. Trans
Attorney, Agent, or Firm—Thomas A. Briody; Jack E. Haken; Anne E. Barschall

[57] ABSTRACT

A database is stored in a mass memory. For this purpose, it is first divided into main cells and then into base cells according to a predetermined regular division pattern. Each base cell is then checked to see whether its data content is sufficient to occupy substantially completely a storage parcel having a predetermined capacity. If this is the case, the base cell is thus accommodated in a storage parcel; if this is not the case, adjacent base cells are grouped until a storage parcel is occupied substantially completely. The operation of addressing a storage parcel is effected by the use of a main cell table in which address pointers are stored, each of which points to a base cell table. In the base cell table, an index is given for each base cell and this index indicates in which storage parcel the relevant base cell is accommodated. Each of these indices indicates a location in a data paracel list at which an address indicator is present, which indicates the location at which the relevant parcel is stored in the mass memory.

18 Claims, 6 Drawing Sheets

FIG.2

METHOD FOR STORING A PARCELWISE DIVIDED DIGITAL DATA BASE AS WELL AS OF ADDRESSING A DATA PARCEL IN A MASS MEMORY, AND APPARATUS FOR CARRYING OUT THE METHOD

BACKGROUND OF THE INVENTION

The invention relates to a method for storing a digital data base in a mass memory whose capacity is divided into a number of storage parcels each having a predetermined storage capacity, said method comprises the following steps:

dividing the data base into a number of main cells according to a predetermined regular division pattern;

dividing each main cell into a further number of data parcels whereby each data parcel covers a respective part of the main cell, which part has a data content occupying substantially completely the storage capacity of a storage parcel;

setting up an identifier table comprising:

(a) a first identifier identifying said predetermined pattern;

(b) a second identifier identifying said division into data parcels;

(c) for each main cell a data parcel list which comprises for each data parcel of that main cell an address-pointer indicating at which memory location the respective data parcel is stored;

loading into said mass memory the data content of each data parcel at the address indicated by its address pointer and loading said identifier table.

Such a method is known from the article "A file organization for Geographic information systems based on Spatial Proximity" of T. Matsuyama, Le Viet Hao, and M. Nagus and published in Computer Vision, Graphics and Image Processing June 26, 1984, No. 3 (New York, USA) page 303-318. In the known method the digital data base, which is formed by geographic information, is first divided into a number of main cells according to a regular division pattern, such as for example a quad tree Using that division pattern the digital data base is partitioned into four rectangular regions. The available storage capacity of the mass memory is divided into a number of storage parcels each having a predetermined storage capacity. In order to use efficiently the available storage capacity, the method checks for each main cell whether the data content thereof fits into one storage parcel. If this is the case, the data content of that main cell forms a data parcel and is stored into a storage parcel. However if the data content of a main cell exceeds the storage capacity of a storage parcel, that main cell is further divided into a further number of data parcels, such that each data parcel occupies substantially completely the storage capacity of a storage parcel. By that division into data parcels the data content is taken into account and so much data is grouped together until a storage parcel is substantially completely occupied. In order to access the stored data an identifier table is set up, which comprises a first identifier identifying the division into main cells, and a second identifier identifying the division into parcels. Further a parcel list is set up in order to indicate at which memory location the different data parcels are stored in the mass memory. After accomplishing that division of the data base, the identifier table and the different data parcel are stored at respective addresses in the mass memory.

A disadvantage of the known method is that the division of the main cells into data parcels is realized according to an arbitrary division pattern wherein only the data content is taken into account. The efficient use of the available storage capacity thus obtained is overridden by the need of storing a complicated second identifier which identifies the arbitrary division pattern used for the parcel division. Such a complicated second identifier not only requires much storage capacity but also renders the search of a particular parcel rather difficult and complicated.

SUMMARY OF THE INVENTION

The invention has for its object to provide a method for storing a digital data base in a mass memory, which method makes use of a less complicated division into parcels, which division can also be represented by a simpler second identifier which can be stored by using less storage capacity.

For this purpose, a method according to the invention is characterized in that main cells which comprise more than one data parcel are divided according to a further predetermined regular division pattern into such a number of base cells that the data content of each base cell is storable into a storage parcel and whereby said parcels being formed by combining each time one or more adjacent base cells of a same main cell, each base cell only belongs to one and the same data parcel, and whereby said identifier table is set up by:

(a) compiling a main cell table comprising said first identifier and further for each main cell divided into base cells a further address pointer indicating a mass memory location at which a base cell table for that main cell is stored;

(b) forming for each main cell divided into base cells said second identifier by forming a number of indices, each index indicating a respective data parcel of its appertaining main cell;

(c) assigning to each base cell the index of the respective data parcel in which it is accommodated;

(d) compiling for each main cell divided into base cells a base cell table comprising a base cell identifier and a list of the base cells with their assigned index;

and whereby each base cell table being loaded at its respective address indicated by its respective further address pointer. By using a further predetermined regular division pattern for dividing main cells into base cells, identification of the base cells is easy to realize, and the storage of an identifier identifying the division into base cells does not require much storage capacity. Because data parcels are now formed by combining base cells, a data parcel can easily be forwarded by recognizing which base cell is accommodated in that parcel. Recognizing a base cell is also easy because base cells are formed by using a regular division pattern. Further the second identifier can now simply be formed by a number of indices. The link between a base cell and the parcel in which it is accommodated is formed by assigning to each base cell the index of the respective data parcel in which it is accommodated. The division of main cells into base cells according to a regular division pattern and the grouping of the base cells into data parcels thus offers a less complicated division into parcels, and requires less storage capacity for storing the second identifier.

The invention further relates to a method of addressing a data parcel in a mass memory, in which a database is stored parcelwise wherein main cells which comprise more than one data parcel are divided according to a further predetermined regular division pattern into such a number of base cells that the data content of each base cell is storable in a storage parcel, said parcels being formed by combining each time one or more adjacent base cells of a same main cell, so that each base cell only belongs to one and the same data parcel, the method further comprising the following steps in setting up said identifier table:

(a) compiling a main cell table comprising said first identifier and further for each main cell divided into base cells a further address pointer indicating a mass memory location at which a base cell table for that main cell is stored;

(b) forming for each main cell divided into base cells said second identifier by forming a number of indices, each index indicating a respective data parcel of its appertaining main cell;

(c) assigning to each base cell the index of the respective data parcel in which it is accommodated; and (d) compiling for each base cell divided into base cells a base cell table comprising a base cell identifier and a list of the base cells with their assigned index; and each base cell table being loaded at its respective address indicated by its respective further address pointer. The data parcel to be addressed is identified by a virtual addresss constituted by a data word belonging to the data content of that data parcel.

A method of addressing a data parcel in a mass memory according to the invention is characterized in that it comprises the following steps:

a. fetching the main cell table from the mass memory;

b. determining in what main cell the virtual address supplied is located by use of the first identifier and selecting that main cell;

c. determining by using the further address pointer of the selected main cell the address at which the base cell table associated with the selected main cell is stored in the mass memory;

d. fetching the selected base cell table stored at the determined address;

e. determining in which base cell the virtual address supplied is located by use of the base cell identifier from the selected base cell table and selecting this base cell;

f. fetching from the base cell table and index assigned to the selected base cell;

g. selecting the data parcel indicated by the fetched index from the parcel list associated with the selected main cell;

h. determining from the address pointer of the selected parcel a storage address for addressing a data parcel in the mass memory;

i. fetching the data contact of the selected parcel.

By using the first identifier from the main cell table and the base cell identifier from the base cell table, it is possible to trace in a simple and rapid manner in which main cell and base cell, respectively, the virtual address is located. Once the searched-for base cell has been traced, the index assigned to the searched-for base cell indicates the data parcel in which the searched-for base cell is located. This index indicates a position in the data parcel list in which an address pointer is stored, which indicates the location in the mass memory at which the data within the selected data parcel are stored.

A first preferred embodiment of a method according to the invention is characterized in that the base cells of a same main cell are represented in the base cell table by indicators, which are arranged according to a predetermined order, and that the indices assigned to each base all indicate a position into the data parcel list. By ordering the base cells in the base cell table, searching for a data parcel is simplified and a structure is provided for the storage of the data.

It is favourable that each parcel list is stored in the mass memory at an address which has a given offset from the storage address of ths associated base cell table. As a result, it is possible to form the address of the associated data parcel list simultaneously with the formation of the address at which the base cell table is stored as a result of which the base cell table and the data parcel list can be fetched in the same reading operation.

It is favourable that the capacity of a storage parcel has a byte length which lies between 2K bytes and 32K bytes. 2K bytes corresponds to the capacity of a sector on an optical or a magnetic disc. 32K bytes can still be fetched from the mass memory within a reasonable time.

When the database is a roadmap, it is favourable that when the database is divided into main cells which cover equal surface areas, according to the predetermined regular division pattern and that when each main cell is divided into base cells covering equal surface areas, according to the further predetermined regular division pattern, the number of base cells in each main cell is an even power of 2. Thus, a simple division, such as for example a quad tree, of the data base can be obtained.

It is favourable that the main cells and the base cells are each formed by a square segment of the road-map, and that the first identifier and the base cell identifier, indicate respectively the length of the square from which each main cell and each base cell is formed. Searching in the database is thus simplified because coordinates of the road-map can now be used directly in calculation.

A further preferred embodiment of a method according to the invention is characterized in that the order assigned to the main cells and the base cells is determined using a Peano-N key. The use of a Peanno-N key provides an efficient method of tracing a data parcel for storing and searching road-maps stored in the mass memory.

It is favourable that a further virtual address is formed by adding to the virtual address a predetermined value and that the data parcel in which the further virtual address is located is also fetched. In the case of road-maps as a data base, information is thus fetched ready for the next part of the journey.

The invention also relates to an apparatus for carrying out the method of addressing a data parcel.

The invention is particularly useful in vehicle navigation systems. In this case, it is of great importance to store road-map data as efficiently as possible and to address them as efficiently as possible.

BRIEF DESCRIPTION OF THE FIGURES

The invention will be described more fully with reference to the drawings, in which:

FIG. 2 shows a division of main cells into base cells;

DETAILED DESCRIPTION OF THE PREFERRED EMBODIMENT

Figure 1:
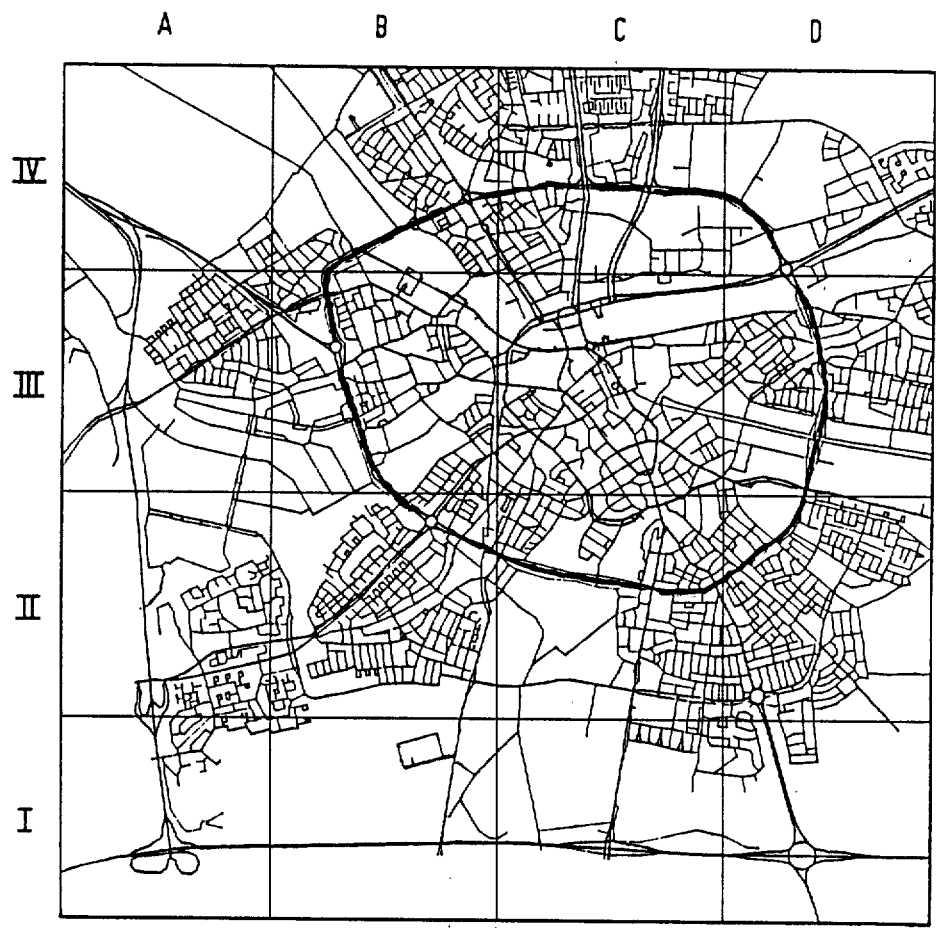
FIG. 1 shows an embodiment of a road-map comprising the map of a town divided into main cells.

The content of a data base is determined either by nature, such as, for example, a map of the courses of the rivers in Europe or a map in which the various mountains of the Alps are indicated, or by a map of systems formed by man over the years, such as, for example, a road system, an encyclopaedia, a dictionary or a telephone-book. Such a database has, when it is divided systematically, for example into blocks having the same surface area for a road-map or alphabetically for a dictionary or a telephone-book, an unequal degree of occupation for the various parts. For example, a dictionary of the Dutch language includes only a few words with the initial letter q, x or y, whereas the words with, for example, the initial letter d, or v occupy numerous pages. The same problem arises with maps of towns or with road-maps. FIG. 1 shows the map of a town. It is clear from this FIGURE that, for example, the degree of occupation of the blocks CIV and CIII is considerably higher than that of the blocks AI and BI.

This unequal degree of occupation causes a problem when such a database is digitized and is stored bit-wise in a mass memory, such as, for example, an optical disc (CD-ROM) or a magnetic disc. In fact, if the same amount of storage space were to be taken for each block, the amount of storage space would be determined by the block having the highest degree of occupation and this would lead to an inefficient use of the storage space available.

Nor is it efficient to store the data base continuously without previously having carried out a systematic division, because searching for a given datum in this data base would then become too complicated and too time-consuming. Furthermore, when storing the data, the mutual relationship between the various blocks on the one hand and between the data within the same block on the other hand has also to be taken into account. For example, in the case of the map of FIG. 1, the relationship between the roads of the block CI and the data with which the block CII is stored in the mass storage as well as the relationship between the block CII and the adjacent blocks must be clear. In the case of a translation dictionary, the words which have the same meaning in the different languages must be stored at adjacent locations; otherwise, too much time is lost when addressing the storage locations.

The need to make an efficient use of the available storage space, whilst taking into account the mutual relationship between data and further whilst providing for efficient and rapid searching for a given datum in the mass storage leads to stringent requirements with respect to the division of the database and to the storage thereof in the mass memory.

The invention will now be described with reference to an embodiment, in which a road-map is chosen as the database. The invention is not limited to all to this embodiment, however, and can be used for any database which can be divided into blocks having different occupation degrees.

Starting from the map shown in FIG. 1, this map is divided according to a predetermined regular division pattern into sixteen blocks having the same dimensions. Each of these blocks designated as main cells, represents the same surface area. After the division into main cells it is determined for each main cell whether the data content in the main cell fits into a storage parcel of the mass memory. A storage parcel is a unit of space in the mass memory having a predetermined capacity, for example one or more successive sectors of a disc memory. For an optical memory, such as DC-ROM or CD-Interactve case, a storage parcel will contain at least 2K bytes, i.e. the storage capacity of at least one sector on a CD-ROM.

An upper limit for the capacity of a storage parcel is, for example, 32K bytes, which represents a quantity of bytes which still can be read out comparatively rapidly (about 0.2 sec for a CD-ROM) and can be stored in a working memory, for example a RAM. Preferably, a capacity of 10K bytes is chosen for a storage parcel. As a result, a quantity of information is fetched within a very short time (about 0.07 sec for a CD-ROM), which quantity is sufficient on the one hand to display an image on a display unit and on the other hand to build up a supply of information. If the information comprises a road-map, 10K bytes of information is sufficient to tune, in a navigation system, the information supply to the speed at which the vehicle is moving so that the actual position of the vehicle as well as data about the roads to be used by further travelling can be displayed continuously on a display screen. The use of storage parcels having a capacity of 10K bytes further offers the ability to fetch, if appropriate, several parcels in the same reading operation and to store them in the working memory. The main cells for which the data fit into one storage parcel, such as, for example, the main cell AI, are not subdivided any further. Conversely the main cells for which the data will not fit into one storage parcel, such as, for example, CII, CIII, BII, BIII are divided further according to a further predetermined regular division pattern into smaller blocks, those within the same main cell having the same dimensions.

Figure 2:
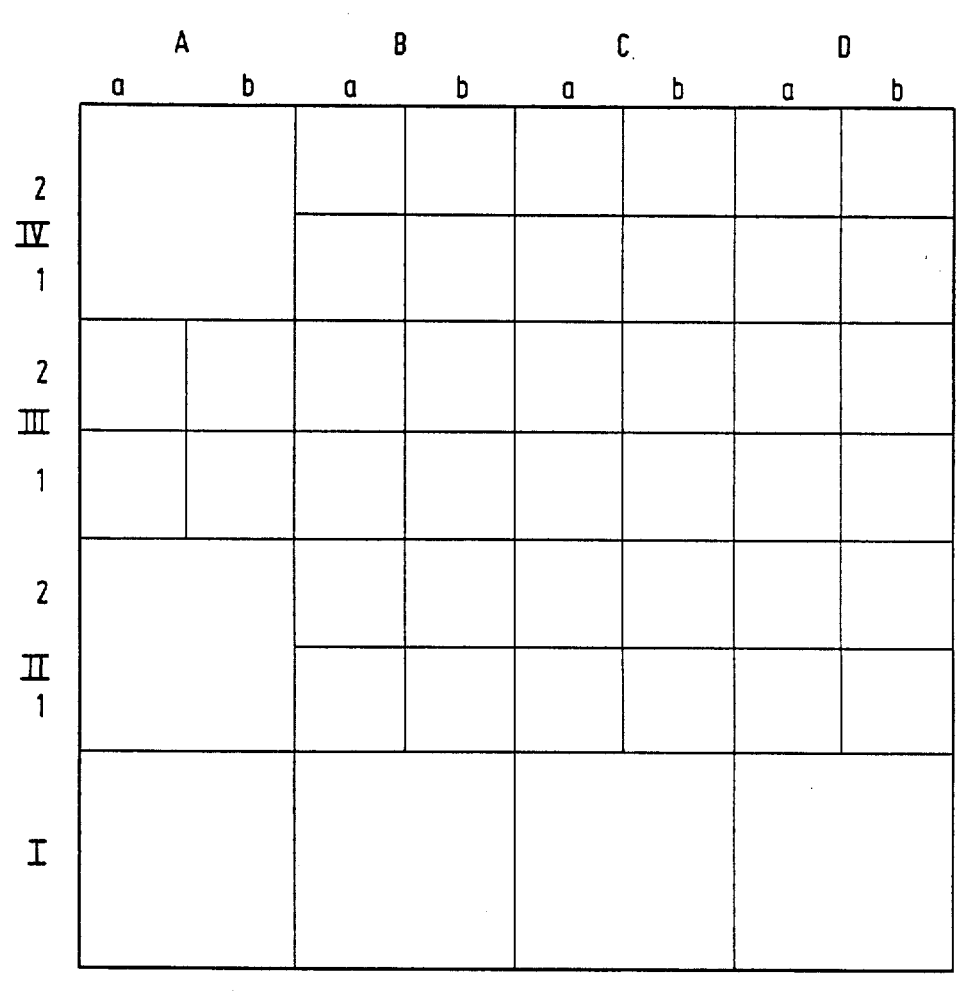

FIG. 2 shows such a division into smaller blocks of the map shown in FIG. 1. The main cells AIII, BII, III, IV and CII, III, and IV, and DII, III, and IV are now each divided into four equal parts (so-called region quad tree division): AIIIa1, AIIIa2, AIIIb1, AIIIb2, BIIa1, BIIa2, BIIb1, BIIb2 etc., whereupon it is again determined whether the data content of each of these parts fits into a storage parcel of the mass memory. If it is now assumed that the data content of each of these parts can be stored in one storage parcel, it is not necessary to subdivide it further. If the data content of such a party should not fit into the same storage parcel, it would be further divided into four parts (quad tree division) having equal dimensions and this process would be repeated until the data content of each part thus obtained fits into a storage parcel. The number of parts thus obtained within the same main cell is then always an even power of 2 and each part is square. Such a part, of which the data content fits into a storage parcel, is designated as a base cell for that main cell. A main cell can therefore be divided into a number of base cells, which all have the same dimensions. In contrast, the dimensions of the base cells of different main cells are allowed to differ from each other.

Figure 3:
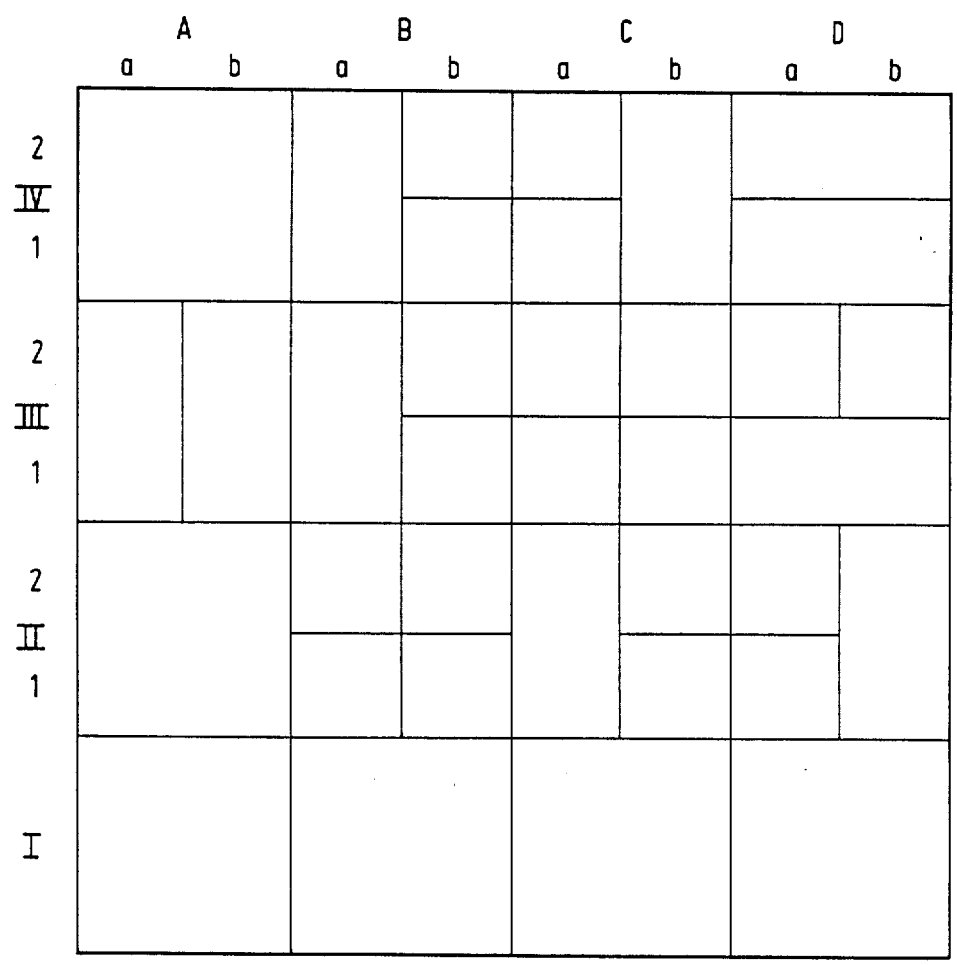
FIG. 3 shows the grouping of base cells into parcels.

However, the division of main cells into base cells may result in the degree of occupation of a number of these base cells being insufficient to occupy a storage parcel substantially completely. In order that this does not cause an inefficient use of the capacity of the mass memory, it is now determined for each base cell thus defined whether the data content thereof is sufficient to occupy a storage parcel substantially completely. For this purpose, it is checked, for example, whether the data content (number of K bytes) of such a base cell is sufficient to occupy at least 75% of the capacity of a storage parcel. If such a base cell comprises an insufficient quantity of data to so occupy substantially completely a storage parcel, the adjacent base cells are checked and it is determined how far one or more adjacent base cells can be grouped together to collect a sufficient quantity of data to substantially completely occupy a storage parcel in the memory. It is found by inspection of the data content of the base cells BIVa1 and a2 can be combined into one data parcel. The base cells BIIIa1 and a2, AIIIa1 and a2 and BIII b1 and b2, CIVb1 and b2, CIIa1 and a2, DIIb1 and b2, DIIIa1 and b1, DIVa1 and b1, DIVa2 and b2 can also be grouped into single data parcels as shown in FIG. 3. In this manner, a division of the database is thus obtained which leads to an efficient use of the storage space available. The requirements imposed on this grouping of base cells are that each data parcel can only contain base cells from one main cell, and that a same base cell can only belong to one and the same data parcel.

This method of dividing a data base can be used not only for road-maps and plans, but also for other databases. For example: in a dictionary, a main cell could be assigned to each letter, and this main cell would then be divided into data parcels; or in a telephone-book, each data parcel could represent one or more underground distribution chambers.

Once the database has been divided into data parcels, it has been rendered suitable for storage parcelwise in a mass memory. The problem of efficiently storing the database is thus solved. Besides storing the database parcelwise in a mass memory, it must also be possible to retrieve in an efficient manner a datum from this stored database. Moreover, since a user is accustomed to addressing a database by content, the apparatus for accessing the data of the database in the mass memory must also be capable of addressing this database by content. This requirement means that the mass memory must consequently be addressable by means of virtual addresses. These virtual addresses must then be translated into physical addresses in order to fetch data from the mass memory.

Figure 4:
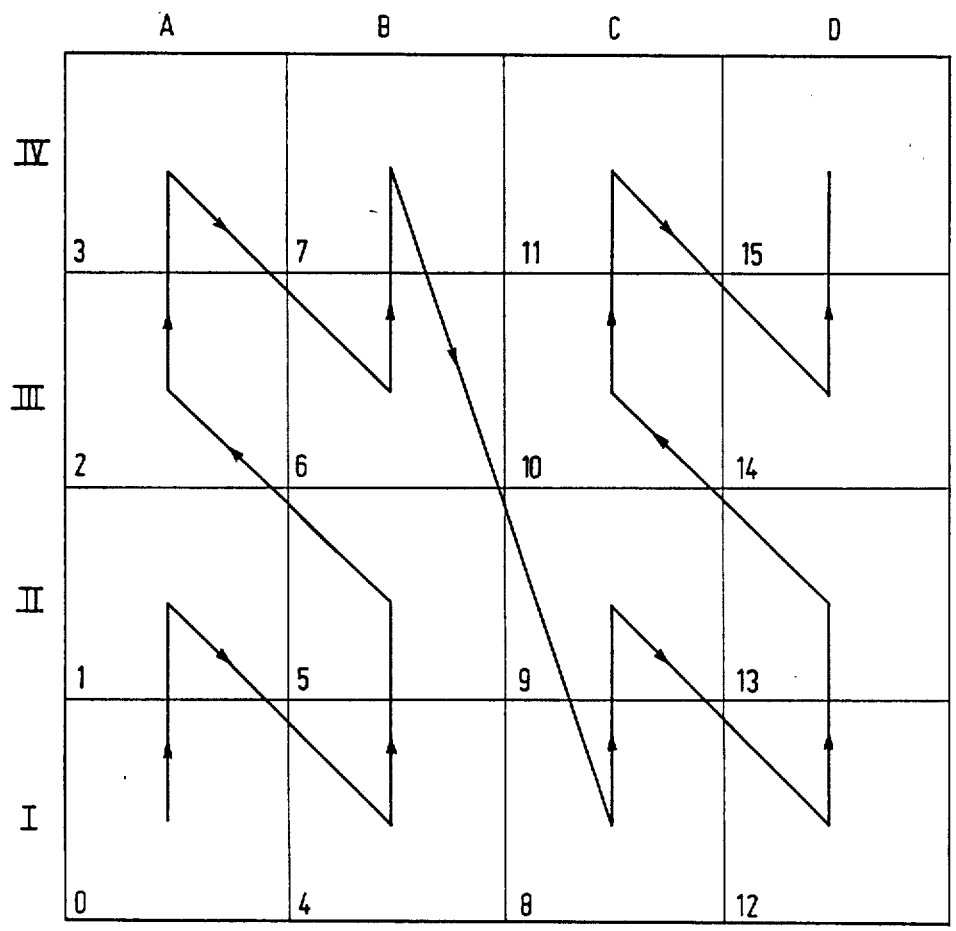
FIG. 4 shows an embodiment of a Peano-N key drawn on the map.
Figure 5:
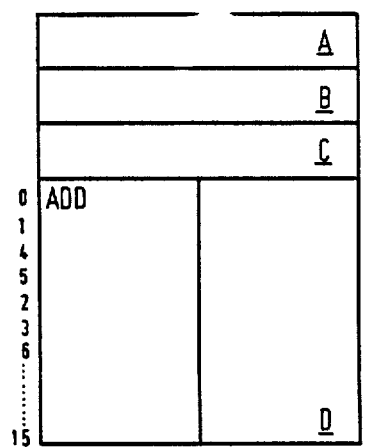
FIG. 5 shows a main cell table.

The division of the memory content into storage parcels now ensures that such a translation of a virtual address into a physical address can be realized in a simple manner. If there is any mutual relationship between adjacent main cells and/or base cells, as is the case, for example, with road-maps, it is preferable to arrange these main cells according to a predetermined order. The cells are preferably arranged by using a Peano-N key (named after the nineteenth-century Italian mathematician Guiseppe Peano). FIG. 4 shows an example of a Peano-N key which is drawn for the map of FIG. 1. The main cells are enumerated as indicated in FIG. 4. The number 0 is assigned to the main cell at the bottom on the lefthand side (AI), while the number 1 is assigned to the main cell AII, and so on, until the main cell DIV at the top, righthand side, is assigned the number 15. The Peano-N key now defines in what order the main cells are arranged. For example, the main cell to which the number 0 is assigned is the first one in the order, followed by the main cells 1, 4, 5, 2 . . . 11, 14, 15. This arrangement affords the advantage that adjacent main cells, such as, for example, 0, 1, 4 and 5, are stored close to one another so that at the transition from reading one to reading the other main cell the access time is reduced, because the displacement of the reading head, when using a disc-shaped memory, remains small. At a predetermined location in the mass memory, a main cell table is now stored, which serves as a reference index for the various main cells. FIG. 5 shows an example of such a main cell table. The table is composed of several parts. Part A comprises an identification of the whole data content of the mass memory. For example, it is stated here that the memory contains a road-map of a give country or a dictionary of a given language. Part B comprises information about the extent of the stored data base; for example in the case of a road-map, the geographic coordinates of the point (XL,YL) situated at the lower corner on the lefthand side and of the point (X,Y) situated at the upper corner on the righthand side of the map are indicated in part B. In the case of a telephone-book, for example the districts over which the database extends are stored in part B by means of numerical codes. A first identifier representing the division pattern is stored in part C. This first identifier denotes, for example for a road-map, the actual surface area or the actual length (LM) of a main cell. In the example of a dictionary, the first identifier indicates, for example, the number of different initial letters per main cell. Part D comprises an ordered list with an address pointer (ADD) for each main cell, each address pointer indicating a storage location at which further information in the relevant main cell is stored. Moreover, beside each address pointer (ADD) the storage capacity occupied by the relevant main cell is indicated in sectors or bytes. By means of this table, it is therefore posible to select a given main cell from the database and by use of the address pointer to fetch further information from the selected main cell stored in the mass memory.

If, as shown in FIG. 4, use is made of a Peano-N key for ordering the various main cells, the various address pointers as stored in the part D of the main cell table are also arranged in an order obtained by the use of a Peano-N key. The numbers indicated in FIG. 5 correspond to the numbers of the main cells, ordered as shown in FIG. 4.

Figure 6:
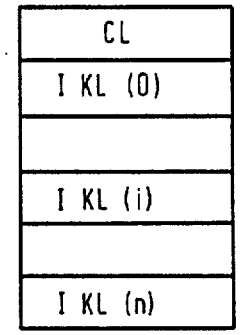
FIG. 6 shows a base cell table.

Each address indicator present in the main cell table indicates a storage location at which for the relevant main cell a base cell table as shown in FIG. 6 is stored. As already described, a main cell may be composed of a number of base cells. In this base cell table a base cell identifier (CL) is stored, such as for example, the surface area or the length of a base cell, in the case of a roadmap. The base cell table further comprises a collection of indices (IKL(0) . . . , IKL(n), with n+ equal to the number of base cells of that main cell), the index IKL(i) ($0 \leq i \leq n$) indicating in which data parcel the base cell i is accommodated. The base cells are preferably also arranged in accordance with a Peano-N key.

Figure 7:
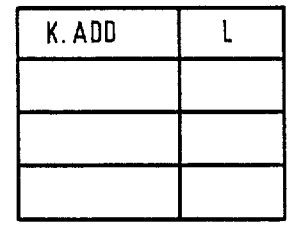
FIG. 7 shows a parcel list.

An index IKL(i) in the base cell table indicates a location in a data parcel list as shown in FIG. 7. The data parcel list comprises a further address pointer for each parcel which forms part of the relevant main cell.

The further address pointer indicates the initial address (K.ADD) in the mass memory at which the data of the parcel are stored. The data parcel list also comprises a parcel length (L) in numbers of sectors or bytes for the relevant data parcel. Preferably, the data parcel list is stored at an address in the mass storage which has a predetermined offset from the address at which the associated base cell table is stoed such that the data parcel list is stored in the immediate proximity of the base cell table. For each main cell only one data parcel list is available. When using a CD-ROM as the mass memory, this has the advantage that the access time for access to the base cell table and the data parcel list is reduced because no large displacement of the reading head is necessary in this operation.

The storage main cell tables and their respective base cell table, together with a data parcel list requires only a small amount of storage space. As an illustration of this fact, a practical example will now be considered, namely a map covering a surface area of $256 \times 256$ km². This surface area is divided into main cells each covering a surface ara of $8 \times 8$ km². Each main cell is divided again into base cells covering a surface area of $0.5 \times 0.5$ km². If each main cell covers a surface area of $8 \times 8$ km², the whole database is divided into $2^{10} = 1024$ main cells $(256 \times 256 = (2^5.8).(2^5.8) = 2^{10}.8.8)$. The main cell table consequently comprises 1024 address pointers with associated length of the main cell. In order to store these data, a storage capacity of about 8K bytes is required for the main cell table. Since the base cells covera surface area of $0.5 \times 0.5$ km², there are 256 base cells per main cell $(8.8 = 2^4.(0.5).2^4.(0.5) = 2^8((0.5).(0.5)) = 256.((0.5).(0.5)))$. The base cell table consequently comprises 256 indices IKL, which corresponds to 256 bytes if one byte is chosen for each index. If it is now assumed that a parcel covers on an average a surface area of 1.1 km², there are $256/4 = 64$ different parcels per main cell. If a capacity of 10 bytes per storage parcel is chosen for the data from the parcel list, the data parcel list occupies an overall capacity of $64 \times 10 = 640$ bytes.

If it is assumed that during a reading operation four main cells are fetched, it is necessary then to fetch a quantity of data representing the main cell table, four base cell tables and four data parcel lists, amounting to 8K bytes $+4X (640+256)$ bytes $\simeq 12K$ bytes. The operation of fetching 12K bytes from a CD-ROM takes less than 0.1 sec and consequently does not form a large overhead for the system.

The operation of addressing a location in the mass memory will now be described with reference to an example, in which it is assumed again that the database stored in a CD-ROM or CD-I represents a road-map of a given country or of a part thereof. It is further assumed that the main cells and the base cells are ordered by using a Peano-N key. The CD-ROM disc is loaded into a reading device forming part of a vehicle navigation system.

Figure 8:
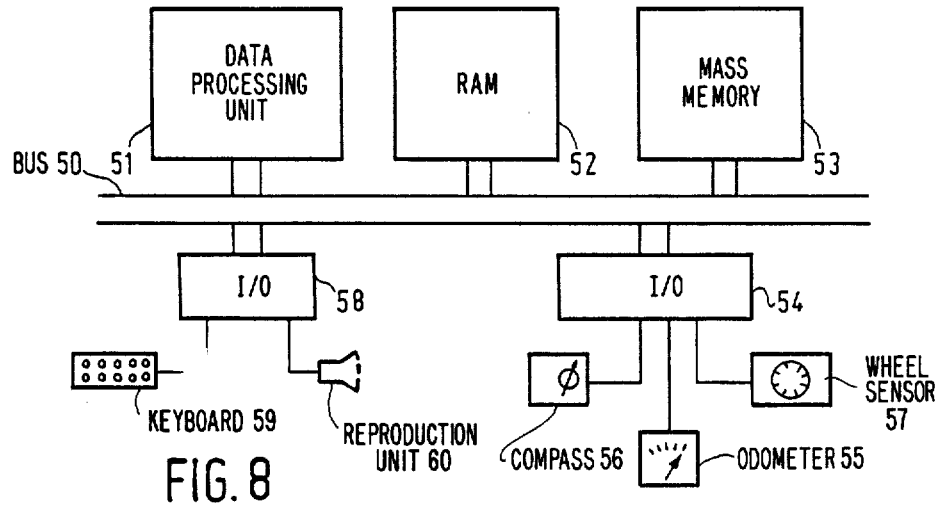
FIG. 8 shows the main elements of an embodiment of a land vehicle navigation device.

FIG. 8 shows the main elements of an embodiment of a land vehicle navigation system. The system comprises a bus 50 to which a data processing unit 51, for example a microprocessor, is connected even as a working memory (RAM,52) and the mass memory 53. The mass memory is preferably formed by an optical disc (CD-ROM) and its appertaining reading devie road-map data, navigation data and other control data are stored in the mass memory. To the bus, there are further connected a first 54 and a second 58 input-output interface.

An electromagnetic compass 56, wheel sensors 57 and an odometer 55 are connected to the first interface. All these elements 55, 56 and 57 serve to collect data in order to determine the actual position of the vehicle. The determination of the vehicle position is for example described in the article "EVA-Ortnungs-und Navigationssystem für Landfahrzeuge" of E. P. Neukirchner, O. Pilsak and D. Schlögl, published in Nachrichtenzeitschrift Bd 36 (1983) Haft 4, pages 214–218. To the second interface 58 there are connected a keyboard 59 and a reproduction unit 60. Further details of how the vehicle position is determined, how the progression of the vehicle is monitored and represented on the reproduction unit are for example described in the international patent application PCT WO 86102764.

After the CD-ROM has been loaded into the reading device, the user inputs via the keyboard 59 its departure point and its destination. This takes plce according to a known method, for example by giving the street-names of the departure point the destination. When a streetname is given, the system translates it into coordinates of the road-map. A set of coordinates of the departure point and a set of coodinates of the destination form in themselves two virtual addresses for addressing the CD-ROM.

Figure 9:
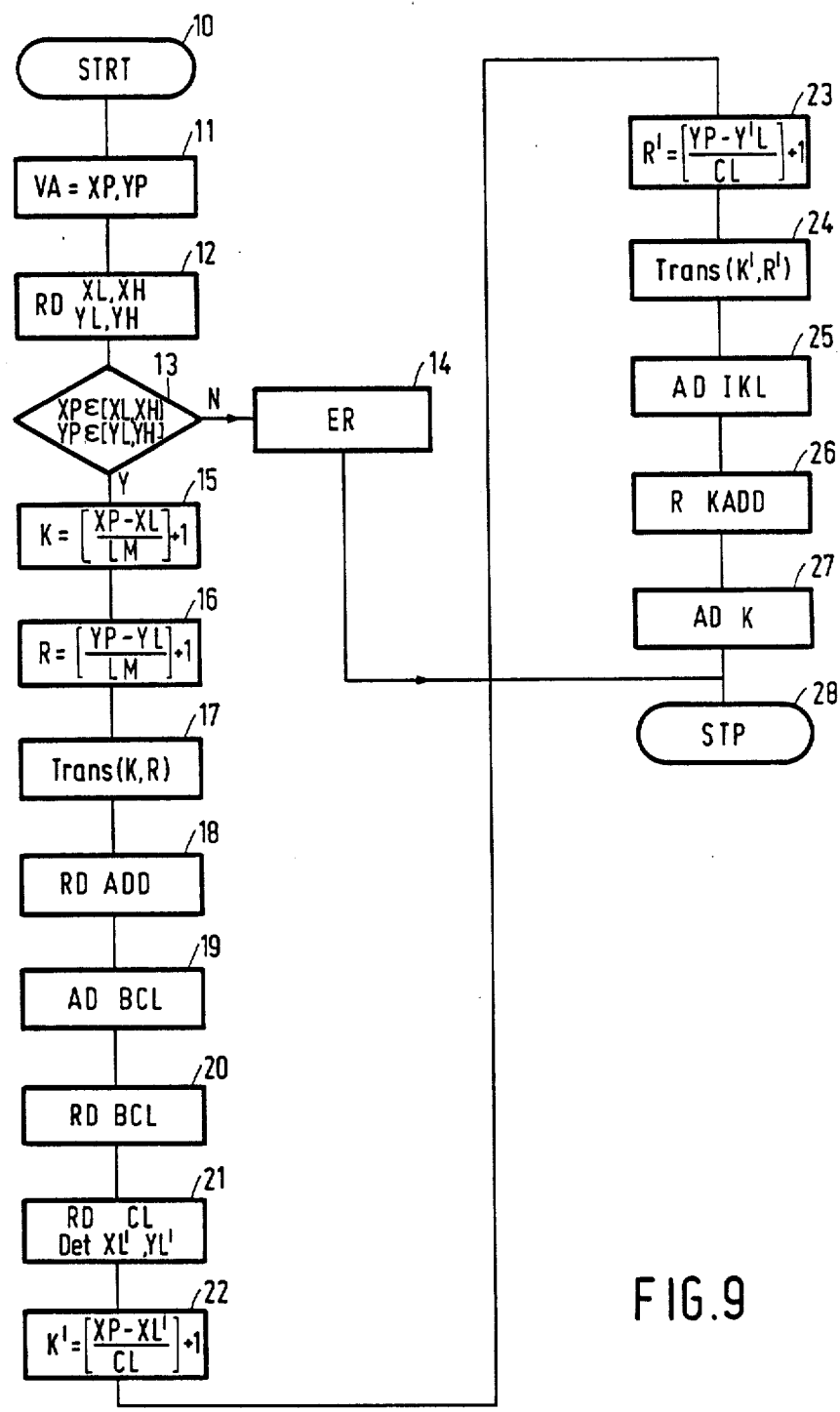
FIG. 9 is a flow diagram of a method according to which a parcel is fetched from the mass memory in response to a virtual address.

FIG. 9 is a flow diagram of a method in which by means of a virtual address a storage parcel is fetched from the mass memory. This method is carried out under the control of the data-processing unit 31. After the start (STRT, 10) of the program, the virtual address offered (VA=XP,YP,11) is stored in a first register which forms part of its data processing unit and the main cell table is fetched from the mass memory and written into the working memory 52. The information about the extent of the database is now fetched from the main cell table (12). In the example of the road-map, this information comprises the coordinates (XL,YL; XH,YH) as well as the first identifier (LM). This information is stored in a second register. Subsequently, it is checked (13) that this virtual address has a value lying between the limit values indicated in the main cell table. In the example of the road-map, it is then checked whether XP$\Sigma$[XL,XH] and YP$\Sigma$[YL, YH].

If the virtual address is not located within these limit values, an error indication is given [ER, 14]. If on the contrary the virtual address is located within these limit values, it is determined in what main cell the virtual address is located. When the main cells are enumerated as indicated in FIG. 4 and are moreover arranged according to a Peano-N key, the number of the main cell within which the virtual address is located and the order of this main cell in the main cell table are determined in a manner as shown below with reference to an example. Let it be assumed that XL=0, YL=0 and that XP=155, YP=230 and LM=100. Now consider the main cells as shown in FIG. 4 as elements of a matrix, i.e. arranged in rows and columns. For a given virtual address, the column is first determined (15) by means of the following expression:

$$K = \left[\frac{XP - XL}{LM}\right] + 1,$$

where [ ] represents the mathematical function INTEGER.

In the given example, this becomes $$K = \left[ \frac{155 - 0}{100} \right] + 1 => K = 2.$$

The row is then determined in an analogous manner (16).

$$R = \left[ \frac{YP - YL}{LM} \right] + 1$$

$$R = \left[ \frac{230 - 0}{100} \right] + ==> R = 3$$

The virtual address is therefore located in the second column (K=2) and the third row (R=3). This datum (K=2, R=3) is now translated (17) into a main cell number (K=2, R=3 →6. In fact, a number is assigned to each combination (K,R) when the main cells are enumerated as indicated in FIG. 3. The main cell having the number 6 is the seventh in the series if an arrangement according to a Peano-N key is used. Consequently, in order to select the main cell in which the virtual address supplied is located, the seventh location in the part D of the main cell table is addressed and the address pointer with associated length stored there is read (18).

By using the selected address pointer, an address is not formed by means of an address generator which is part of its microprocessor and which address indicates a location in a mass memory at which the base cell table for the selected main cell is stored (19). The base cell table present at the address formed is now fetched (20) and is written into the working memory. The base cell identifier (CL) is now fetched from this base cell table and further the initial coordinates (XL', YL') of the origin of the selected main cell are determined (21). The initial coordinates of the origin of the selected main cell are determined by using the calculated values K and R.

$$XL' = XL + (K-1)LM$$

$$YL' = YL + (R-1)LM$$

In the example given this yields:
XL'=0+(2−1)LM;   YL'=0+(3−1)LM
==>XL'=100  YL'=200

The values for XL', YL' and CL are stored in a further register. Subsequently, in the same manner as for the main cells there is determined within which base cell the virtual address is located. For this purpose, the following calculations are carried out.

$$K' = \left[ \frac{XP - XL'}{CL} \right] + 1 \quad (22)$$

$$R' = \left[ \frac{YP - YL'}{CL} \right] + 1 \quad (23)$$

in which K' and R' represents the column and the row, respectively, within which the base cell is located. In the example given, this yields, when CL is chosen to be equal to 25:

$$K' = \left[ \frac{155 - 100}{25} \right] + 1; R' = \left[ \frac{230 - 200}{25} \right] + 1$$

$$K' = 3; R' = 2$$

This value (K',R') is then translated (24) into a base cell number ((K',R')→9), which is then converted into a location (9→10) within the base cell table. An index IKL is present at this selected location within the base cell table and this index indiates in what data parcel the selected base cell is accommodated.

On the basis of this index, an address is now formed (25), which indicates a location within the data parcel list. The address indicated at this selected location within the parcel list is now fetched (26) and this address is then applied to the mass memory and the content is fetched (27) and loaded into the working memory. Thus, the working memory now contains the information of the data parcel within which the virtual address offered is located. The method is thus completed (28).

Preferably, when fetching the base cell table (step 20), the data parcel list is also fetched. For each main cell divided into base cells there is always one base cell table and one parcel list, which are stored, preferably in the proximity of each other, in the mass memory. By simultaneously fetching the base cell table and the data parcel list, an additional access to the mass memory to fetch the data parcel list is avoided and time is saved.

A further saving in the time for access to the mass memory can be obtained by fetching several storage parcels in the same reading operation. For this purpose, a predetermined value Q is added to or subtracted from the calculated values K' and R' depending upon the direction in which the vehicle is moving.

$$K'' = K' \pm Q$$

$$R'' = R' \pm Q$$

with furthermore the requirement that $1 \leq K'' \leq LM/CL$ and $1 \leq R'' \leq LM/CL$.

In the example chosen, in which K'=3 and R'=2, if Q=2, for example, this yields: K''=5 and R'' is 4 or K''=1 and R''=0.

As a result, several base cells are selected and, if they belong to different storage parcels, also several storage parcels are selected.

What is claimed is:

1. A method for storing a digital data base in a memory whose capacity is divided into a number of storage parcels each having a predetermined storage capacity, said method comprising the following steps:
   dividing the data base into a number of main cells according to a predetermined regular division pattern;
   dividing each main cell into a further number of data parcels, so that each data parcel covers a respective part of the main cel, which part has a data content occupying substantially completely the storage capacity of a storage parcel;
   setting up an identifier table comprising:
   (a) a first identifier identifying said predetermined pattern;
   (b) a second identifier identifying said division into a data parcel; and (c) for each main cell a data parcel list which comprises for each data parcel of that main cell an address pointer indicating at which memory location the respective data parcel is stored; and loading into said memory the data content of each data parcel at the address indicated by its address pointer and loading said identifier table;

wherein main cells which comprise more than one data parcel are divided according to a further predetermined regular division pattern into such a nuber of base cells that the data content of each base cell is storable in a storage parcel, said parcels being formed by combining each time one or more adjacent base cellls of a same main cell, so that each base cell only belongs to one and the same data parcel, the method further comprising the following steps for setting up said identifier table:

(a) compiling a main cell table comprising said first identifier and further for each main cell divided into base cells a further address pointer indicating a memory location at which a base cell table for that main cell is stored;

(b) forming each main cell divided into base cells said second identifier by forming a number of indices, each index indicating a respective data parcel of its appertaining main cell;

(c) assigning to each base cell the index of the respective data parcel in which it is accommodated; and (d) compiling for each main cell divided into base cells a base cell table comprising a base cell identifier and a list of the base cells with their assigned index; each base cell table being loaded at its respective address indicated by its respective further address pointer.

2. A method of addressing a data parcel in a memory, in which a database is stored parcelwise whilst using a method as claimed in claim 1, the data parcel to be addressed being identified by a virtual address constituted by a data word belonging to the data content of that data parcel, the method comprising the following steps:

a. fetching the main cell table from the memory;
b. determining in what main cell the virtual address supplied is located by use of the first identifier and selecting that main cell;
c. determining by using the further address pointer of the selected main cell the address at which the base cell table associated with the selected main cell is stored in the memory;
d. fetching the selected base cell table stored at the determined address;
e. determining in which base cell the virtual address supplied is located by use of the base cell identifier from the selected base cell table and selecting this base cell;
f. fetching from the base cell table the index assigned to the selected base cell;
g. selecting the data parcel indicated by the fetched index from the parcel list associated with the selected main cell;
h. determining from the address pointer of the selected parcel a storage address for addressing a data parcel in the memory; and
i. fetching the data content of the selected parcel.

3. An apparatus for retrieving data, the apparatus comprising:

(a) a memory whose capacity is divided into a plurality of storage parcels each having a predetermined storage capacity, the memory being for containing a data base which comprises an identifier table comprising:

(i) a main cell table comprising:
　(A) a first identifier which identifies a first predetermined regular division pattern which divides the data base into a first number of main cells; and
　(B) at least one first address pointer corresponding to at least one respective main cell identified by the first identifier;

(ii) for each main cell occupying more than one storage parcel, a respective base cell table pointed to by such a first address pointer, and corresponding to a second division of any main cells which comprise more than one data parcel, each data parcel being a part of a respective main cell, which part has a data content occupying substantially completely the storage capacity of a respective one of the storage parcels, the second division resulting from a division of any such main cells into a first set of base cells according to a second predetermined regular division pattern the base cell table comprising:
　(A) a base cell identifier; and
　(B) a list of base cells with respective indices, each index indicating a respective data parcel of the respective main cell, so that at least two adjacent base cells in said first set and within a same main cell share an index, effectively resulting in at least one combined base cell, each combined base cell corresponding to only one data parcel; and (iii) a respective data parcel list corresponding to each main cell which occupies more than one storage parcel, each data parcel list including a respective second address pointer for each respective data parcel in the corresponding main cell, the respective second address pointer indicating a memory location where the respective data parcel is located, the second address pointer being locatable using an index from an appropriate base cell table;

(b) memory means for storing a supplied virtual address and a fetched copy of the main cell table;
(c) first selection means for selecting a selected main cell, in which the supplied virtual address is located, using the first identifier from the fetched copy of the main cell table;
(d) first address generation means for generating from the first address pointer the address for the base cell table associated with the selected main cell;
(d) second selection means for selecting a selected base cell from the base cell table using the supplied virtual address and the base cell identifier;
(e) third selection means for selecting on the basis of the index associated with the selected base cell a data parcel from the data parcel list; and
(f) second address generation means for generating on the basis of the respective second address pointer of the selected data parcel the address at which a corresponding storage parcel is stored.

4. A vehicle navigation system comprising the apparatus of claim 3 wherein the data base comprises a road map.

5. A method for storing a digital data base in a memory whose capacity is divided into a plurality of storage parcels each having a predetermined storage capacity, the method comprising the following steps:
- (a) first dividing the data base into a plurality of main cells according to a first predetermined regular division pattern;
- (b) second dividing any main cells which comprise more than one data parcel, each data parcel being a part of the respective main cell, which part has a data content occupying substantially completely the storage capacity of a respective one of the storage parcels, said second dividing comprising:
  - (i) dividing main cells which comprise more than one data parcel into a first set of base cells according to a second predetermined regular division pattern; and
  - (ii) combining one or more adjacent base cells within a same main cell to reduce a number of base cells within that same main cell, said combining resulting in a second set of base cells, which second set includes at least one combined base cell, so that any combined base cell resulting from said combining corresponds to only one data parcel; and
- (c) setting up an identifier table comprising:
  - (i) a main cell table comprising
    - (A) a first identifier identifying said plurality of main cells according to said first pattern; and
    - (B) for each main cell which is divided into base cells, a respective first address pointer indicating a memory location of a corresponding base cell table;
  - (ii) at least one base cell table pointed to by such a first address pointer and comprising a base cell identifier identifying the base cells in said first set according to said second pattern and a list of the base cells in said first set with respective indices, each index indicating a respective data parcel of the respective main cell, so that at least two base cells in said first set and within a same main cell share an index; and
  - (iii) for each main cell which is divided into base cells, a respective data parcel list which comprises a respective second address pointer for each respective data parcel in that main cell, the respective second address pointer indicating a memory location where the respective data parcel is stored.

6. A memory loaded with a database comprising an optical memory, wherein the database is loaded into the memory by use of the method as claimed in claim 5.

7. The method of claim 5 wherein the indices from the base cell table indicate respective second address pointers in the data parcel list.

8. A method for retrieving data from a data base stored in a memory whose capacity is divided into a plurality of storage parcels each having a predetermined storage capacity, the method comprising the following steps:
- (a) first fetching a main cell table from memory, the main cell table comprising;
  - (i) a first identifier which identifies a plurality of main cells according to a first predetermined regular division pattern, which first pattern divides the data base into the main cells; and
  - (ii) at least one first address pointer corresponding to at least one respective main cell identified according to the first identifier;
- (b) first selecting a main cell and one first address pointer using the first identifier and a virtual address identifying a data parcel within the main cell, which data parcel is a part of the main cell which part has a data content occupying substantially completely the storage capacity of a respective one of the storage parcels;
- (c) second fetching a base cell table pointed to by the one first address pointer, said base cell table comprising:
  - (i) a base cell identifier identifying a plurality of base cells according to a second predetermined regular division pattern, which second pattern divides the main cell into a first set of base cells; and
  - (ii) a list of the base cells in the first set with respective indices, each index indicating a respective data parcel of the respective main cell, so that at least two adjacent base cells in said first set share an index, effectively resulting in at least one combined base cell, each combined base cell corresponding to only one data parcel;
- (d) second selecting a base cell from the first set and a respective index using the base cell identifier and the virtual address;
- (e) third fetching a data parcel list comprising a respective second address pointer for each respective data parcel in the main cell, which second address pointer is locatable using the indices from the base cell table; and
- (f) third selecting a second address pointer from the data parcel list using the respective index.

9. The method of claim 8 wherein
- (a) the base cell table and the data parcel list are stored at a predetermined offset from one another, and
- (b) said second and third fetching steps are performed in a single retrieving step.

10. A method as claimed in claim 8, in which the database is a road-map, and wherein the virtual address is formed using the geographic coordinates associated with the geographic location to be indicated.

11. A method as claimed in claim 8, 9, or 10, in which the data base is a road-map, wherein:
a further virtual address is formed by adding a predetermined value to the virtual address, and
the method further comprises fetching a storage parcel containing the further virtual address.

12. A method as claimed in claim 8, wherein each parcel list is stored in the memory at an address which has a given offset from the storage address of the associated base cell table.

13. A method as claimed in claim 8, wherein the capacity of a storage parcel has a byte length lying between 2K bytes and 32K bytes.

14. The method of claim 5 or 8 wherein each data parcel occupies at least 75% of storage capacity of the respective one of the storage parcels.

15. The method of claim 5 or 8 wherein
the database is a road map;
the first pattern divides the database into main cells which cover equal surface areas; and
the second pattern divides the database into base cells which cover equal surface areas such that a number of base cells in said first set is an even power of two.

16. A method as claimed in claim 15, wherein:
the main cells and the base cells are each formed by respective square segments of the road-map, and
the first identifier and the base cell identifier indicate respectively respective lengths of the respective squares from which the respective main cells and the respective base cells are formed.

17. The method of claim 15 wherein the first and base cell identifiers comprise respective first and second functions for locating entries within the main and base cell tables, respectively, which entries are arranged according to a Peano-N key.

18. The method of claim 16 wherein the first and base cell identifiers comprise respective first and second functions for locating entries within the main and base cell tables, respectively, which entries are arranged according to a Peano-N key.

* * * * *